US006754355B2

(12) United States Patent
Stetzler et al.

(10) Patent No.: US 6,754,355 B2
(45) Date of Patent: Jun. 22, 2004

(54) DIGITAL HEARING DEVICE, METHOD AND SYSTEM

(75) Inventors: Trudy D. Stetzler, Houston, TX (US); Pedro R. Gelabert, Sugarland, TX (US); Tod D. Wolf, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 634 days.

(21) Appl. No.: 09/732,343

(22) Filed: Dec. 7, 2000

(65) Prior Publication Data

US 2002/0071583 A1 Jun. 13, 2002

Related U.S. Application Data

(60) Provisional application No. 60/171,394, filed on Dec. 21, 1999.

(51) Int. Cl.[7] .............................................. H04B 15/00

(52) U.S. Cl. ...................... 381/94.2; 381/94.3; 381/314

(58) Field of Search ................................ 381/94.2, 320, 381/314, 330, 313, 315, 312, 94.3

(56) References Cited

U.S. PATENT DOCUMENTS

| | | | | |
|---|---|---|---|---|
| 5,027,410 A | * | 6/1991 | Williamson et al. | 381/68.4 |
| 5,318,502 A | * | 6/1994 | Gilman | 600/25 |
| 5,651,071 A | * | 7/1997 | Lindemann et al. | 381/68.2 |

FOREIGN PATENT DOCUMENTS

| | | | | |
|---|---|---|---|---|
| JP | 359063899 A | * | 4/1984 | H04R/25/04 |
| JP | 360127000 A | * | 7/1985 | H04R/27/02 |

OTHER PUBLICATIONS

Wayne et al. ; A Single–Chip Hearing Aid . . . Capacitor Filters; Proceddings of IEEE 1992.*

* cited by examiner

*Primary Examiner*—Melur Ramakrishnaiah
(74) *Attorney, Agent, or Firm*—W. James Brady, III; Frederick J. Telecky, Jr.

(57) ABSTRACT

According to one embodiment of the present invention, a digital hearing device is disclosed. The digital hearing aid includes a microphone for receiving sound, which may include an analog signal. The analog signal is converted by a first converter into a digital signal. Filters are provided to divide the digital signal into multiple signal parts. A signal processor may be provided for each signal part, and performs signal processing on its respective signal part. An adder adds the output of the signal processors, which results in a processed digital signal. A second converter converts the processed digital signal back into an analog signal. A speaker then outputs the analog signal. According to another embodiment of the present invention, a method for enhancing sound is provided. The method includes the steps of: (1) receiving sound containing an analog signal; (2) converting the analog signal to a digital signal; (3) dividing the digital signal into signal parts; (4) performing signal processing on the signal parts; (5) adding the processed signal parts, resulting in a processed digital signal; (6) converting the processed digital signal to a processed analog signal; and (7) outputting the processed analog signal. According to another embodiment of the present invention, a digital hearing system is provided. The digital hearing system includes at least one hearing device and a central processing unit. The hearing device includes a microphone for receiving sound that includes an analog signal, a transmitter for transmitting the analog signal, and a receiver for receiving a processed analog signal. The central processing unit includes a receiver for receiving the analog signal from the hearing device, a signal processor for processing the signal, and a transmitter for transmitting the processed signal to the hearing device.

17 Claims, 2 Drawing Sheets

FIG. 1
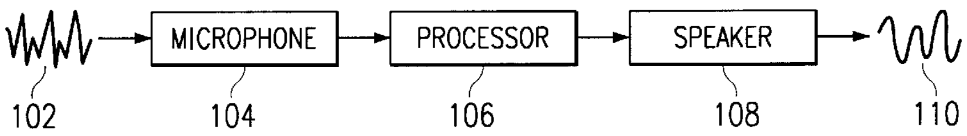
FIG. 2
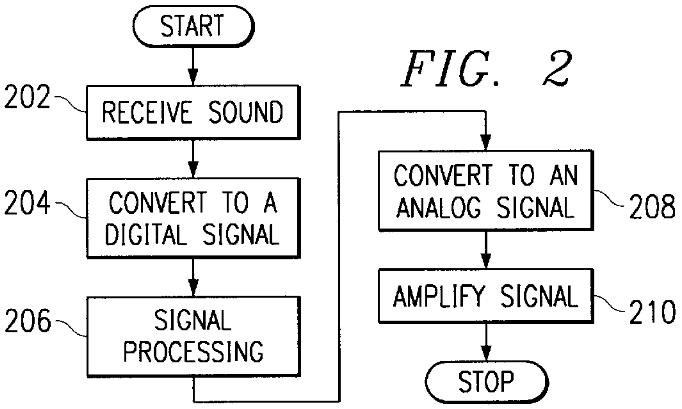
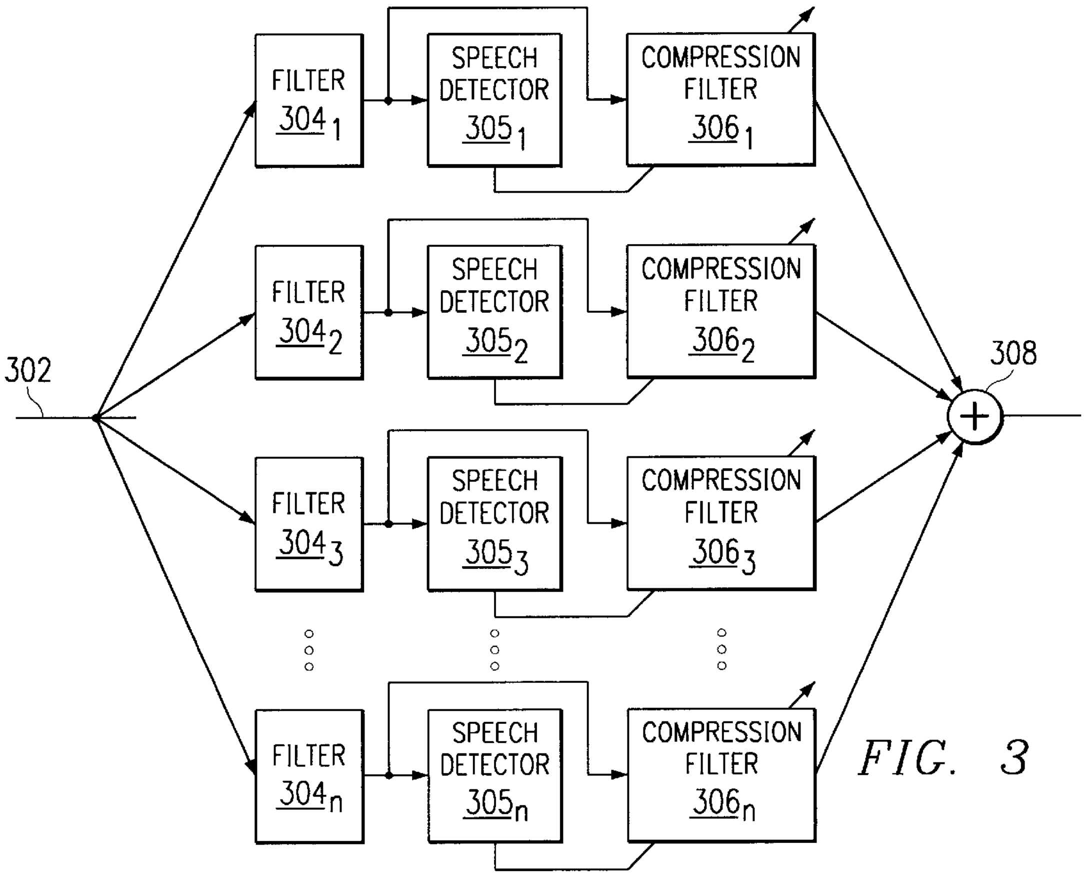
FIG. 3

DIGITAL HEARING DEVICE, METHOD AND SYSTEM

This application claims priority under 35 USC §119(e)(1) of provisional application No. 60/171,394, filed Dec. 12, 1999.

BACKGROUND OF THE INVENTION

1. Field of the Invention

This invention relates to hearing devices; specifically, it relates to a digital hearing device.

2. Description of the Related Art

One of the problems of everyday life is the presence of noise. Repeated exposure to noise is not only annoying, but may result in the deterioration of a person's ability to hear. Thus, sound attenuation devices, such as earplugs and headphones, have been developed. For example, airport workers wear headphones to reduce the noise of jet engines. Construction workers wear headphones to reduce the noise of their equipment. People wear earplugs on airplanes to reduce the constant drone of jet engines. Soldiers wear earplugs to reduce the sound of rifles, guns, and heavy machinery. There are countless other situations in which the reduction, or elimination, of noise is desired.

SUMMARY OF THE INVENTION

Although present sound attenuation devices attenuate undesirable sounds, they attenuate all frequencies equally, resulting in the reduction to hear desired sounds. Thus, the airport worker wearing headphones might not hear an alarm. The construction worker might not hear the back-up warning sound of a truck. The soldier might not hear a close enemy rustle leaves.

Therefore, a need has arisen for a hearing device that overcomes these and other deficiencies of the related art.

According to one embodiment of the present invention, a digital hearing device is disclosed. The digital hearing aid includes a microphone for receiving sound, which may include an analog signal. The analog signal is converted by a first converter into a digital signal. Filters are provided to divide the digital signal into multiple signal parts. A signal processor may be provided for each signal part, and performs signal processing on its respective signal part. An adder adds the output of the signal processors, which results in a processed digital signal. A second converter converts the processed digital signal back into an analog signal. A speaker then outputs the analog signal.

According to another embodiment of the present invention, a method for enhancing sound is provided. The method includes the steps of: (1) receiving sound containing an analog signal; (2) converting the analog signal to a digital signal; (3) dividing the digital signal into signal parts; (4) performing signal processing on the signal parts; (5) adding the processed signal parts, resulting in a processed digital signal; (6) converting the processed digital signal to a processed analog signal; and (7) outputting the processed analog signal.

According to another embodiment of the present invention, a digital hearing system is provided. The digital hearing system includes at least one hearing device and a central processing unit. The hearing device includes a microphone for receiving sound that includes an analog signal, a transmitter for transmitting the analog signal, and a receiver for receiving a processed analog signal. The central processing unit includes a receiver for receiving the analog signal from the hearing device, a signal processor for processing the signal, and a transmitter for transmitting the processed signal to the hearing device.

A first technical advantage of the present invention is that a digital hearing device and system is disclosed. Another technical advantage is that the digital hearing device selectively attenuates or amplifies desired frequency ranges. Another technical advantage is that the digital hearing system allows external appliances to be connected to the system. Another technical advantage is that the digital hearing device may use a low-power digital signal processor (DSP).

BRIEF DESCRIPTION OF THE DRAWINGS

FIG. 1 is a block diagram of a digital hearing device according to one embodiment of the present invention.

FIG. 2 is a flowchart of the process of the present invention according to one embodiment of the present invention.

FIG. 3 is a block diagram of the signal processing that the digital signal undergoes according to one embodiment of the present invention.

DESCRIPTION OF THE PREFERRED EMBODIMENT

Figure 4A:
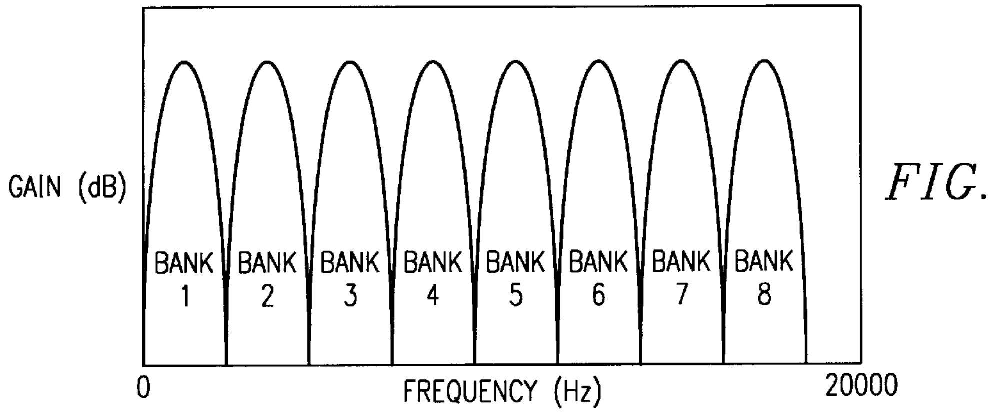
FIGS. 4*a* and *b* are frequency response diagrams of a signal before and after signal processing according to one embodiment of the present invention.

Embodiments of the present invention and their technical advantages may be better understood by referring to FIGS. 1 though 5, like numerals referring to like and corresponding parts of the various drawings.

Referring to FIG. 1, a block diagram of a digital hearing device according to one embodiment of the present invention is provided. Sound 102, which may include undesired noise as well as desired sound, is received by microphone 104. Microphone 104 converts the sound to an analog electronic signal. In one embodiment, EA series electrect condenser microphone, manufactured by Knowles Electronics, Inc. of Elgin, Ill., may be used.

In one embodiment, microphone 104 may be an omnidirectional microphone, or it may be directional microphone. In another embodiment, microphone 104 may be a piezoelectric device.

The electric waveform from microphone 104 is processed by processor 106. Processor 106 may be any suitable device for processing the electric waveform generated by microphone 104. In one embodiment, processor 106 may be a low power digital signal processor (DSP), such as the TMS320C55x DSP, manufactured by Texas Instruments, Inc., Dallas, Tex. A low power DSP generally requires fewer battery changes than a high power DSP. Other low power DSPs may also be used.

Processor 106 may include an analog to digital converter (ADC), filters, a digital to analog converter (DAC), and any other signal processing, all on one chip.

After the signal is processed by processor 104, the signal may be amplified or attenuated, and then output through speaker 108. In one embodiment, a Class D amplifier may be used in conjunction with a speaker to amplify the signal. In one embodiment, the amplifier and speaker may be one part. An example of a suitable Class D hearing aid amplifier is described in U.S. Pat. No. 4,689,819, the disclosure of which is incorporated by reference in its entirety. In one embodiment, CK series Class D amplified receiver/speaker, manufactured by Knowles Electronics, Inc. of Elgin, Ill. may be used. In another embodiment, speaker 108 may be a piezoelectric device. The amplification of the signal results in processed sound 110 being delivered to a user's ear or ears.

Referring to FIG. 2, a flowchart of the method according to one embodiment of the present invention is provided. In step 202, sound is received. This may be by a device, such as a microphone, discussed above. The sound is converted to an analog electronic waveform.

In step 204, the analog signal is converted to a digital signal by an ADC. In one embodiment, the conversion is accomplished at a 32 kHz sampling rate, or greater with 16 bit resolution. This rate and resolution produces acceptable audio quality. Audio quality will, or course, increase with higher sampling rates and with greater resolution.

In step 206, the digital signal is processed. Referring to FIG. 3, digital signal 302 may be passed through a plurality of filter banks, $\mathbf{304}_1$–$\mathbf{304}_n$. Filter banks $\mathbf{304}_1$–$\mathbf{304}_n$ may be provided at several different frequency ranges in order to divide the digital signal into a plurality of parts, or frequency bands, for processing. Generally, filters $\mathbf{304}_1$–$\mathbf{304}_n$ are bandpass filters, and each filter is programmed, or assigned, with a desired range of frequency for the respective filter to pass.

The number of frequency bands, n, depends on the amount of signal processing that is available on the processor. In one embodiment, from about 4 to about 20 frequency bands may be provided. Other numbers of frequency bands may also be provided.

Human hearing generally ranges from about 20 Hz to about 22 kHz. The frequency bands, n, divides this range into a plurality of separate bands. The frequency bands may, but do not have to, be divided equally. For example, in one embodiment, the higher frequency bands may be larger (i.e., they cover a greater frequency range) than the lower frequency bands. The frequency band allocation, however, does not have to be fixed. Instead, the band allocation of the frequency bands may be changed in software without making any changes to the hardware.

Different frequency bands may be defined with respect to the frequencies that need to be eliminated or enhanced. Sounds, such as speech, may be identified and amplified to improve signal-to-noise ratio. The number of bands may be increased, or may be narrowly focused on one or more specific frequency bands.

The n filtered signals are passed to speech detectors $\mathbf{305}_1$–$\mathbf{305}_n$. Speech detectors $\mathbf{305}_1$–$\mathbf{305}_n$ identify the presence of speech, and pass signals consisting substantially of speech, but do not pass signals consisting substantially of noise. Detectors $\mathbf{305}_1$–$\mathbf{305}_n$ may be adaptively controlled, because a speech signal will normally vary across the frequency bands in time. Algorithms for speech detection and noise cancellation are known in the art, and may be employed in speech detectors $\mathbf{305}_1$–$\mathbf{305}_n$.

In one embodiment, speech detectors $\mathbf{305}_1$–$\mathbf{305}_n$ provide coefficient updates to compression filters $\mathbf{306}_1$–$\mathbf{306}_n$. Thus, there are two paths for the digital signal-one that is directly input to compression filters $\mathbf{306}_1$–$\mathbf{306}_n$, and one that is used by speech detectors $\mathbf{305}_1$–$\mathbf{305}_n$ to actively detect the presence of speech in a noisy environment, and change coefficient settings on compression filters $\mathbf{306}_1$–$\mathbf{306}_n$. In one embodiment, speech detectors $\mathbf{305}_1$–$\mathbf{305}_n$ may "remember" particular environments, such as near an aircraft, and when exposed to such an environment a second time, immediately reconfigure compression filter coefficients accordingly.

The n filtered signals are passed to compression filters $\mathbf{306}_1$–$\mathbf{306}_n$, where they undergo further processing. Filters $\mathbf{306}_1$–$\mathbf{306}_n$ may be programmable filters that allow a user to program the amount of attenuation, or the amount of amplification, of a signal in its respective frequency ranges. Filters $\mathbf{306}_1$–$\mathbf{306}_n$ may be adaptively controlled by an algorithm to amplify or reduce the signal content for a given frequency band, depending on whether the band contains noise or a desired signal, such as speech.

Once the signals are processed by compression filters $\mathbf{306}_1$–$\mathbf{306}_n$, they are then added with digital adder 308, to reconstruct the complete digital signal.

Referring again to FIG. 2, following the signal processing, in step 208, the signal is converted to an analog signal by a DAC. In one embodiment, the DAC has a 16 bit resolution, and provides a 16 kHz analog bandwidth output.

After the signal is converted to an analog signal, in step 210, the signal is amplified, and then output to the user's ear through a speaker.

Figure 4B:
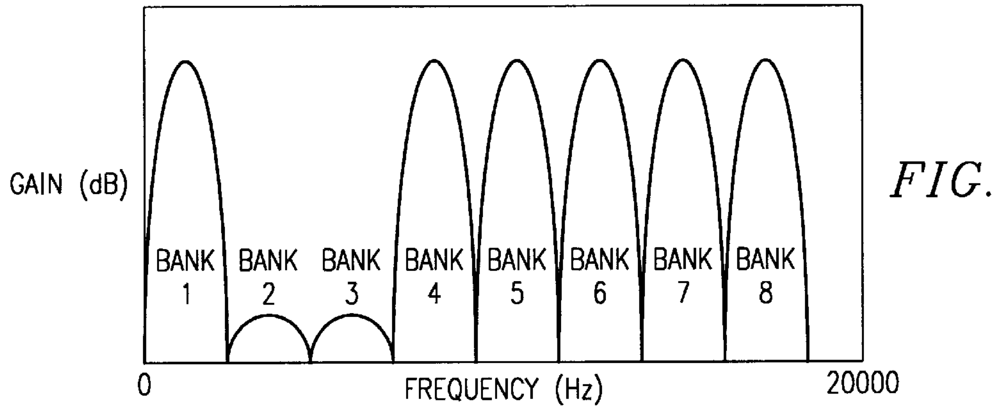

The device of the present invention allows for the adjustment of predetermined frequency ranges. Referring to FIG. 4*a*, an example of the frequency response of the individual filter banks, without adjustment, is provided. As is evident from the figure, each filter bank has the same response characteristics. Thus, sound that is filtered by filter bank 1 will have the same attenuation or amplification as in filter bank 8. Referring now to FIG. 4*b*, however, filter banks 2 and 3 have been programmed to attenuate frequencies at these levels, while allowing, or amplifying, the signal in the other filter banks. For example, if a jet engine's response is in filter banks 2 and 3, the selective attenuation of these banks would reduce or eliminate the sounds passing through the hearing device.

Adaptive filters in the detection blocks may actively determine repetitive noises (such as hums, vibrations, whistles, etc) and adjust the frequency response of the filters in order to remove these noises in the continuously changing environment of the user. Techniques for doing such are known in the art.

In another embodiment, an extension of the noise canceling capabilities is to enhance the listening environment for a person with normal hearing in noisy situations, such as parties, games, etc. Unlike in the previous environments, this unwanted noise (the background conversation) is in the same frequency band as the wanted noise (the immediate conversation). In this case, the background noise may be reduced through beamforming techniques based on the microphones available in each hearing device, so that the listener would only hear the person(s) that he or she is looking at, and the background noise would be attenuated. Multiple microphones housed in the hearing devices, or mounted in jewelry or eyeglasses, may be used. The processor in one, or both, of the hearing devices, may perform beamforming algorithms, which are known in the art. The processor may also be used for the wireless communication with an appropriate analog front end to perform the wireless modulation/demodulation.

Figure 5:
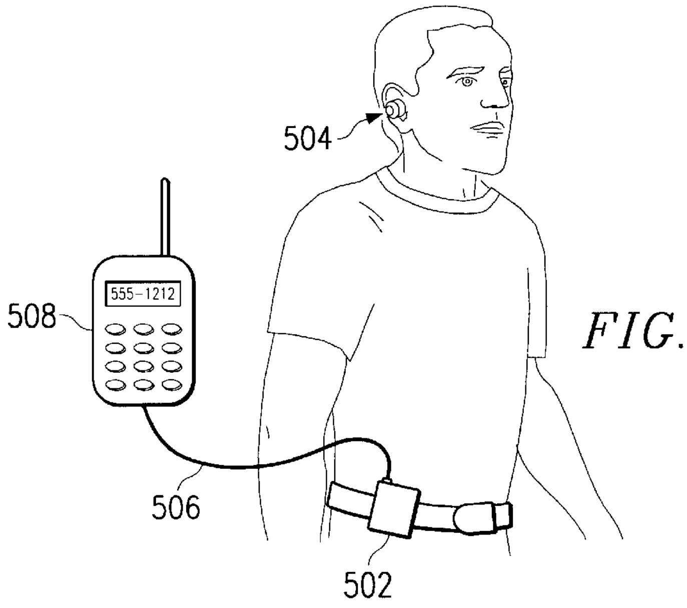
FIG. 5 is a block diagram of a digital hearing system according to one embodiment of the present invention.

In another embodiment, a separate device may be provided to house a central processing unit 502, containing a processor, as described above, while the hearing devices 504 serve as simple transceiver units (receiving sound through a microphone, transmitting it to central processing unit 502, and receiving the processed sound from central processing unit 502), as depicted in the block diagram of FIG. 5.

Hearing devices 504 may communicate with central processing unit via RF signals, or any other signal. In one embodiment, small wires may be provided between hearing devices 504 and central processing unit 502.

In another embodiment, an extension of the noise canceling capabilities could be used to continuously sample the listening environment and automatically adapt the filters for optimal listening conditions. This capability can be implemented with or without user intervention. To enable quick adaptation, the device can learn and store typical listening environments that could be automatically selected.

In one embodiment, external appliances 508, such as audio devices e.g., tape or CD players, radios, television audio outputs, telephones, wireless, cellular, or digital telephones, etc.) may interface with central processing unit 502, and thus networked with the hearing devices. External appliances 508 may interface with central processing unit through wire 506, or they may interface wirelessly.

Hearing devices 504 may contain microphones to receive signals, or a microphone may be provided in central processing unit 504, or in an external item, such as in eyeglasses glasses or in jewelry (not shown). All of these elements may communicate with central processing unit 502 through RF signals, or through wires, or any other suitable communication means.

In the embodiments discussed above, adjustments to the frequency response of the device may be performed by downloading frequency response information from a computer. This may be accomplished through a wire, an infrared link, RF communication, or any other suitable link. A user may be able in adjust the frequency response manually as well. In the embodiment depicted in FIG. 5, the user may enter information directly to central processing unit 502 by any suitable input means, such as, inter alia, spoken commands, a keypad, buttons, knobs, micro-switches, or adjustment screws. The central processing unit may additionally contain a display, such as a LCD or LED to provide operating information for a user.

While the invention has been described in connection with preferred embodiments and examples, it will be understood by those skilled in the art that other variations and modifications of the preferred embodiments described above may be made without departing from the scope of the invention. Other embodiments will be apparent to those skilled in the art from a consideration of the specification or practice of the invention disclosed herein. It is intended that the specification is considered as exemplary only, with the true scope and spirit of the invention being indicated by the following claims, departing from the scope claimed below.

What is claimed is:

1. A digital hearing device, comprising:

at least one microphone for receiving sound, the sound including an analog signal;

a first converter for converting the received analog signal to a digital signal;

a plurality of filters for dividing the digital signal into a plurality of signal parts where each filter of said plurality of filters is assigned a desired range of frequencies;

a plurality of speech detectors with a separate speech detector coupled to each filter of said plurality of filters for detecting the presence of speech in the each of the signal parts, a signal processor provided for performing signal processing on each signal part comprising a separate programmable compression filter for each of said signal parts coupled to each corresponding filter of said plurality of filters and each speech detector for each of said signal parts and wherein said speech detector for each of said signal parts actively detect the presence of speech and change coefficient settings on said compression filter for each signal part;

an adder for adding the output of the signal processor, resulting in a processed digital signal;

a second converter for converting the processed digital signal to a processed analog signal; and a speaker for outputting the processed analog signal.

2. The digital hearing device of claim 1, wherein the signal processor attenuates undesired signal parts.

3. The digital hearing device of claim 1, wherein the signal processor amplifies desired signal parts.

4. The digital hearing device of claim 1, wherein the first converter, the filters, the speech detectors, the signal processors, the adder, and the second converter reside on a digital signal processor chip.

5. The digital hearing device of claim 1, wherein said speech detectors include means for immediately providing signals to reconfigure the compression filter coefficients when detecting certain signal environments.

6. A method for enhancing sound, comprising:

receiving sound containing an analog signal;

converting the analog signal to a digital signal;

dividing the digital signal into a plurality of signal parts;

detecting the presence of speech in the each of the signal parts using speech detectors for each signal part;

performing signal processing on the plurality of signal parts using a separate programmable compression filter for each signal part;

changing coefficient settings on said compression filter for each signal part in response to the detected presence of speech or noise in each signal part;

adding the processed signal parts, resulting in a processed digital signal;

converting the processed digital signal to a processed analog signal; and outputting the processed analog signal.

7. The method of claim 6, wherein the step of dividing the digital signal into a plurality of signal parts comprises:

assigning each of a plurality of filters with a desired frequency range for each of the filters to pass.

8. The method of claim 6, wherein the step of performing signal processing on the plurality of signal parts comprises:

attenuating signal parts that are undesired.

9. The method of claim 6, wherein the step of performing signal processing on the plurality of signal parts comprises:

amplifying signal parts that are desired.

10. A digital hearing system, comprising at least one hearing device, the hearing device comprising:

a microphone for receiving sound, the sound including an analog signal;

a transmitter for transmitting the analog signal; and a receiver for receiving a processed analog signal;

a central processing unit, the central processing unit comprising:

a receiver for receiving the analog signal from the at least one hearing device;

a signal processor for processing the signal comprising:

a first converter for converting the received analog signal to a digital signal; a plurality of filters for dividing the digital signal into a plurality of signal parts where each filter of said plurality of filters is assigned a desired range of frequencies; a plurality of speech detectors with a separate speech detector coupled to each filter of said plurality of filters for detecting the presence of speech in the each of the signal parts, a signal processor provided for performing signal processing on each signal part comprising a separate programmable compression filter for each of said signal parts coupled to each corresponding filter of said plurality of filters and each speech detector for each of said signal parts and wherein said speech detector for each of said signal parts actively detect the presence of speech and change coefficient settings on said compression filter for each part, an adder for adding the output of the signal processor, resulting in a processed digital signal; and a second converter for converting the processed digital signal to a processed analog signal;

a transmitter for transmitting the processed signal to the at least one hearing device;

a user input for receiving input from a user of the hearing system and a display for displaying operating information to the user to permit the user to program the processing unit.

11. The digital hearing system of claim 10, wherein the central processing unit performs beamforming to enhance sound from a desired location.

12. The digital hearing system of claim 10, wherein said central processing unit further comprises:

a coupling for at least one of receiving a signal from an external appliance, and an outputting of a signal to the external appliance.

13. The digital hearing system of claim 12, wherein the external appliance comprises a telephone.

14. The digital hearing system of claim 12, wherein the external appliance comprises an audio device.

15. The digital hearing system of claim 10, wherein said central processing unit further comprises a second microphone.

16. The digital hearing system of claim 10, wherein the at least one hearing device and the central processing unit communicate wirelessly.

17. The digital hearing device of claim 10, wherein said speech detectors include means for immediately providing signals to reconfigure the compression filter coefficients when detecting certain signal environments.

* * * * *